March 28, 1939.  B. S. AIKMAN  2,151,825
FLUID COMPRESSOR
Filed Oct. 15, 1936  2 Sheets-Sheet 1

INVENTOR
BURTON S. AIKMAN
BY *Wm. M. Cady*
ATTORNEY

March 28, 1939.　　　B. S. AIKMAN　　　2,151,825
FLUID COMPRESSOR
Filed Oct. 15, 1936　　　2 Sheets-Sheet 2

INVENTOR
BURTON S. AIKMAN
BY　*Wm. M. Cady*
ATTORNEY

Patented Mar. 28, 1939

2,151,825

UNITED STATES PATENT OFFICE 2,151,825

FLUID COMPRESSOR

Burton S. Aikman, Wilkinsburg, Pa., assignor to Westinghouse Air Brake Company, Wilmerding, Pa., a corporation of Pennsylvania Application October 15, 1936, Serial No. 105,634

7 Claims. (Cl. 308—22)

This invention relates to fluid compressors and more particularly to motor driven air compressors of the vertical reciprocating type.

An object of this invention is the provision of a compressor unit in which the driving and driven portions are so mechanically connected as to assure complete alignment between them at all times.

Another object of this invention is the provision of an air compressor unit in which the motor shaft and compressor crank shaft are so aligned that when assembled they operate as a unit and are supported by three bearings.

It is a further object of my invention to provide a compressor unit of the multiple stage type in which the several cylinders have the same bore and accommodate pistons of similar construction and size.

Other objects and advantages of my invention will be apparent from the following description of one preferred embodiment thereof, reference being had to the accompanying drawings.

Figure 1:
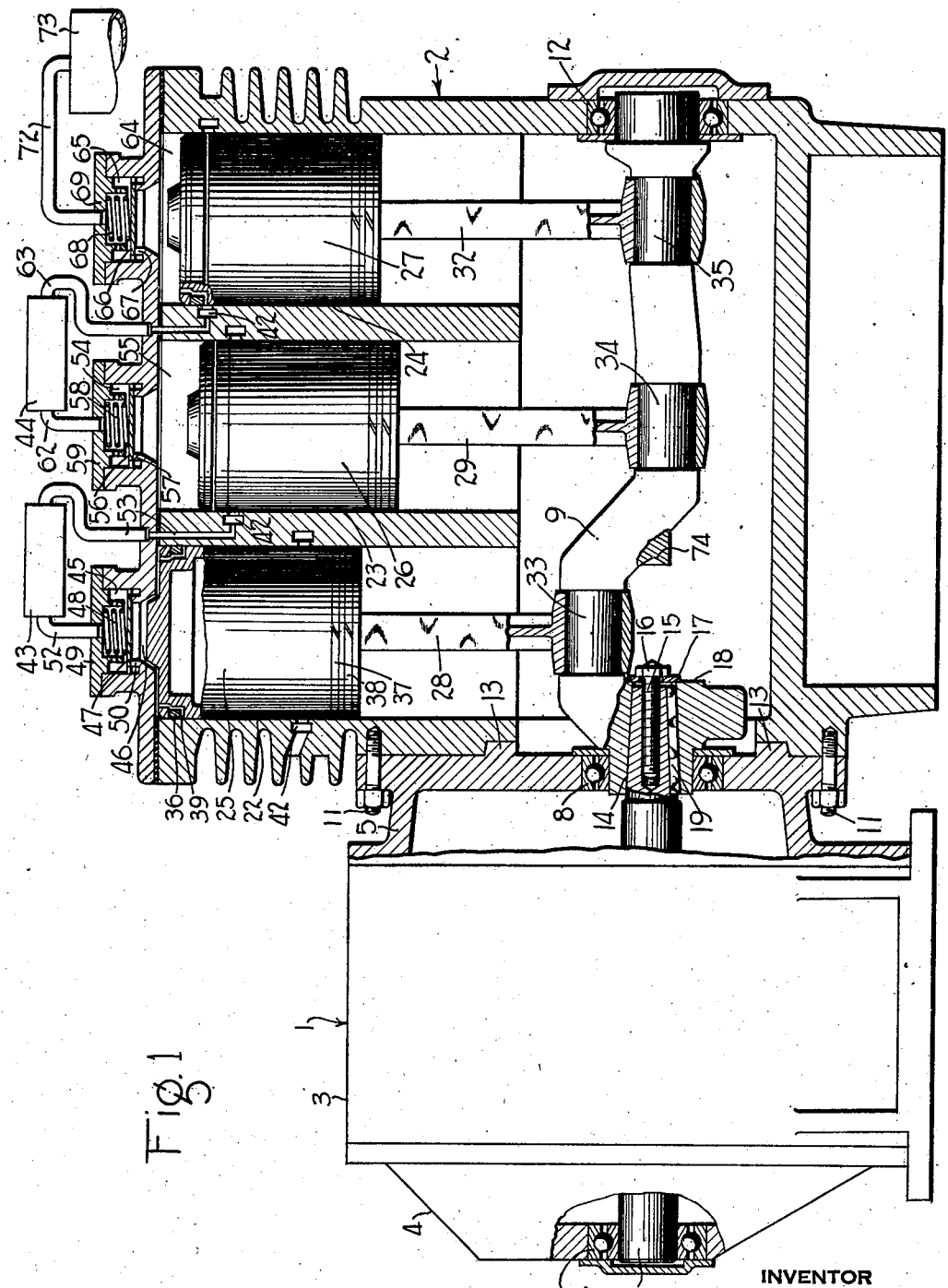
Figure 2:
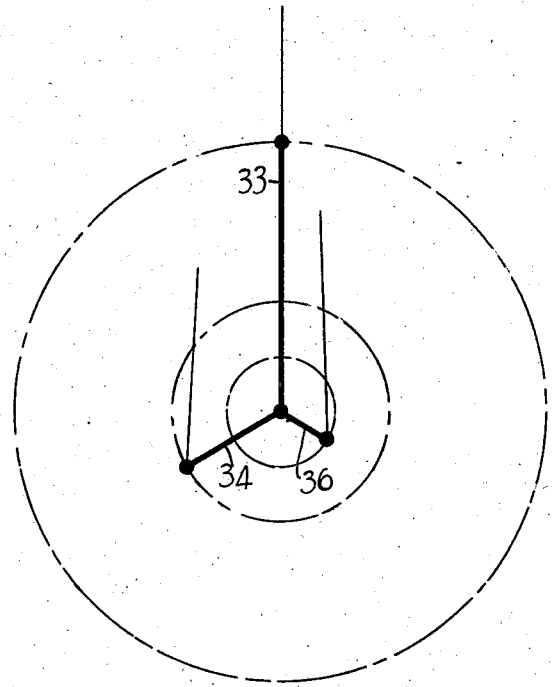
Figure 3:
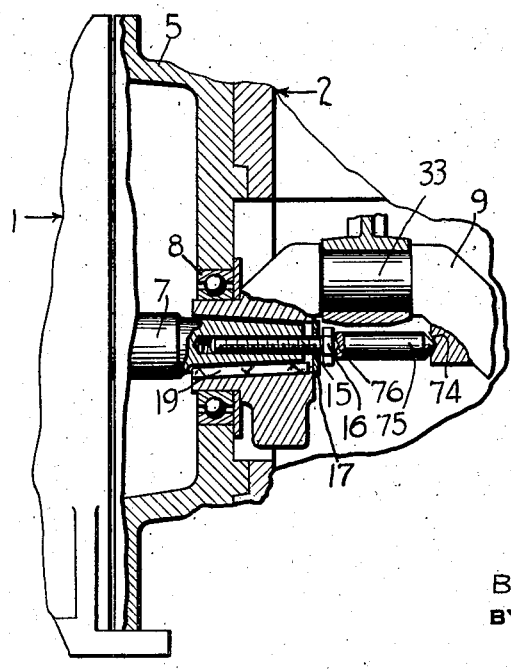

In the drawings Fig. 1 is an elevational view, partly in section, of a compressor unit organized in accordance with my invention, Fig. 2 is a diagrammatic view showing the relation between the angular position and the throw of the several cranks of the crank shaft, and Fig. 3 is a vertical sectional view showing means for disassembling the motor shaft from the compressor crank shaft.

Referring to the drawings a motor 1 is provided for driving the compressor 2 and having a central motor frame 3 for supporting the motor and to the ends of which are attached end frames 4 and 5, respectively, the end frame 4 supporting ball bearings 6 for carrying one end of the motor shaft 7 and the end frame 5 supporting ball bearings 8 for carrying one end of the compressor crank shaft 9, the other end of which is supported in bearings 12 in the casing 2.

The motor 1 may be of standard construction excepting that the end frame 5 is provided with a raised beveled portion 13 for interfitting a corresponding depressed portion in the frame 2 of the compressor unit for lining the bearings 8 and 6 accurately with the bearing 12 when the two frames are drawn tightly together by bolts 11. Also, instead of the usual bearing for directly supporting the end of the motor shaft 7 that is adjacent the compressor unit, the end of the shaft is formed frusto-conical in shape, as shown at 14 to interfit a conical shaped opening in the end of the crank shaft 9, and is drilled and tapped to provide means for receiving a screw 15 having a bolt head 16 for entering the tapped end of the shaft 7 to draw the shafts 7 and 9 tightly together. A washer 17 is provided between the bolt head 16 and a shoulder 18 of the crank shaft 9, and a key 19 is provided to key the shafts 7 and 9 together.

The compressor is of the multiple cylinder-in-line type and, as illustrated, is arranged for compression of gases in three stages. Three cylinder bores 22, 23 and 24 are provided in the casing 2 containing, respectively, pistons 25, 26 and 27 connected to connecting rods 28, 29 and 32 that are respectively connected to cranks 33, 34 and 35 on the crank shaft 9. The cranks 33, 34 and 35 are associated, respectively, with the low pressure, intermediate pressure, and high pressure pistons 25, 26 and 27, and are arranged at angles of 120° from one another as best shown in Fig. 2, the throw of the respective cranks being substantially in proportion to the ratio of compression between the several stages, as desired.

The pistons may be of the light weight type and may each be provided with three rings, an upper ring 36 and two lower rings 37 and 38. The upper ring 36 functions as a pressure ring as well as a valve between the intake chambers 42 and the compression chambers 46, 55, or 64 at the upper ends of the cylinders 22, 23, or 24, respectively. The intake chamber for the low pressure chamber 46 is in communication with the atmosphere, and the intake chambers for the intermediate and the high pressure cylinders are in communication with the intercoolers 43 and 46, respectively.

A valve chamber 45 is provided above the compression chamber 46 and contains a disc valve 47 that is adapted to engage a rib seat 50 to close communication between the chambers 45 and 46 and is urged to its seat by a spring 48, the lower end of which engages the valve 47 and the upper end of which is contained within a bore in a cap nut 49 closing an opening in the upper end of the casing 2. The valve chamber 45 is in communication with the inlet chamber 42 that is associated with the chamber 55 through pipe 52, the intercooler 43 and pipe and passage 53.

A valve chamber 54 is provided above the compression chamber 55 and contains a disc valve 56 that is adapted to engage a rib seat 57 to close communication between the chambers 54 and 55, and is urged to its seat by a spring 58, the lower end of which engages the valve 56 and the upper end of which is positioned within a bore in a cap nut 59. The chamber 54 is in communication through pipe 62, intercooler 44 and pipe 63 with the inlet chamber 42 for the high-pressure cylinder 24. A valve chamber 65 is provided above the compression chamber 64 of the cylinder 24, and contains a disc valve 66 that is adapted to engage a rib seat 67 and is urged to its seat by a spring 68, the lower end of which engages the valve 66 and the upper end of which is positioned within a bore in a cap nut 69 in the upper part of the casing. The valve chamber 65 is in communication through pipe 72 with a storage reservoir 73.

When this structure is assembled the motor end plate 5 is drawn tightly against the casing 2 of the compressor by means of the bolts 11, the beveled surface on the casing 5 cooperating with a corresponding surface on the casing 2 as shown at 13 to bring the bearings 6, 8 and 12 into alignment. The conical end of the shaft 7 fits into the conical bore in the crank shaft 9, and after insertion therein the washer 17 and the screw 15 are positioned, the screw being tightened to bring the conical end of the motor shaft 7 into snug engagement with the conical bore in the end of the crank shaft 9, the two shafts being keyed together by the key 19, as shown in Fig. 1.

A conical depression 74 is provided in the crank shaft 9 in alignment with the screw 15 to provide for the insertion of a plug 75 as shown in Fig. 3, which after a few turns of the screw 15 in a direction to unscrew it from the tapped bore in the end of the shaft 7, will engage a conical depression 76 in the end of the plug 75 so that further movement of the screw 15 in the same direction will cause the shaft 7 to be forced away from the crank shaft 9, as shown in Fig. 3.

Many modifications in the structure illustrated and described may be made within the spirit of my invention and I do not wish to be limited otherwise than by the scope of the appended claims.

Having now described my invention, what I claim as new and desire to secure by Letters Patent, is:

1. In a machine assembly, a driving unit and a driven unit, each having a frame and a rotatable shaft therein, each of said frames being provided with a bearing for receiving and supporting the remote ends of the respective shafts, and one of said frames having a bearing for receiving and supporting the adjacent end of the shaft constituting a part of the other unit, said shaft being arranged to receive and support the adjacent end of the shaft associated with the first unit, means for coupling said shafts in power translating relation, and means for attaching the frames of said two units in position to align said several bearings.

2. In a machine assembly, a driving unit and a driven unit, each having a frame and a rotatable shaft therein, each frame having a bearing for receiving and supporting the remote ends of the respective shafts, one of said frames having a bearing for receiving and supporting the adjacent end of the shaft constituting a part of the other unit, said shaft being arranged to receive and support the adjacent end of the shaft constituting a part of said first named unit, means for coupling said two shafts in aligned relation, and means comprising interfitting beveled portions of said frame positioned to align said several bearings when said frames are rigidly fastened together.

3. In a machine assembly, in combination, a driving unit and a driven unit each having a frame and a shaft rotatable therein, said frames having confronting mounting faces thereon adapted to be secured against each other, the frame of each of said units having a bearing remote from the mounting face thereon and supporting one end of the shaft associated therewith, the frame of one of said units having a bearing adjacent the mounting face thereon and adapted to support the other end of the shaft associated with the other of said units, said end of said shaft having a tapered opening therein, the end of the shaft associated with the first named unit having a tapered portion adapted to be received by said tapered opening to provide a driving connection between said shafts and to support said end of the shaft of the first named unit.

4. In a machine assembly, in combination, a driving unit and a driven unit each having a frame and a shaft rotatable therein, said frames having confronting mounting faces thereon adapted to be secured against each other, the frame of each of said units having a bearing remote from the mounting face thereon and supporting one end of the said shaft associated therewith, the frame of one of said units having a bearing adjacent the mounting face thereon and adapted to support the other end of the shaft associated with the other of said units, said end of said shaft having a tapered opening therein, said shaft being adapted to receive and support the end of the shaft associated with the first named unit, the mounting faces on said frames having interfitting tapered annular surfaces formed thereon and arranged substantially concentric of the axes of said shafts, whereby when said mounting faces are drawn together said shafts are held substantially in alignment.

5. In a machine assembly, in combination, a driving unit and a driven unit detachably secured together, each of said units having a rotatable shaft, one of said shafts being a crank shaft having a main bearing portion adjacent an end thereof, said bearing portion having a substantially axial bore extending therethrough, the other of said shafts having an end portion adapted to be received by said bore, a member having threaded engagement with said other shaft and cooperating with said crank shaft to draw the shafts together, said member being also adapted to exert force against a portion of said crank shaft spaced from said main bearing to press said shafts apart.

6. In a machine assembly, in combination, a driving unit and a driven unit detachably secured together, each of said units having a rotatable shaft, one of said shafts being a crank shaft having a main bearing portion adjacent an end thereof, said bearing portion having a tapered substantially axial bore extending therethrough, the other of said shafts having a tapered end portion adapted to be received by said bore, a member having threaded engagement with said other shaft and cooperating with said crank shaft to draw the shafts together, said member being also adapted to exert force against a portion of said crank shaft spaced from said main bearing to press said shafts apart.

7. In a machine assembly, in combination, a driving unit and a driven unit detachably secured together, each of said units having a rotatable shaft, one of said shafts being a crank shaft having a main bearing portion adjacent an end thereof, said bearing portion having a substantially axial bore extending therethrough, the other of said shafts having an end portion adapted to be received by said bore, a member having threaded engagement with said other shaft and cooperating with the axial end face of said main bearing portion of said crank shaft to draw said shafts together, said member being also adapted to exert force against a surface on said crank shaft spaced from said main bearing portion and disposed in alignment with said bore to press said shafts apart.

BURTON S. AIKMAN.